Figure 1:
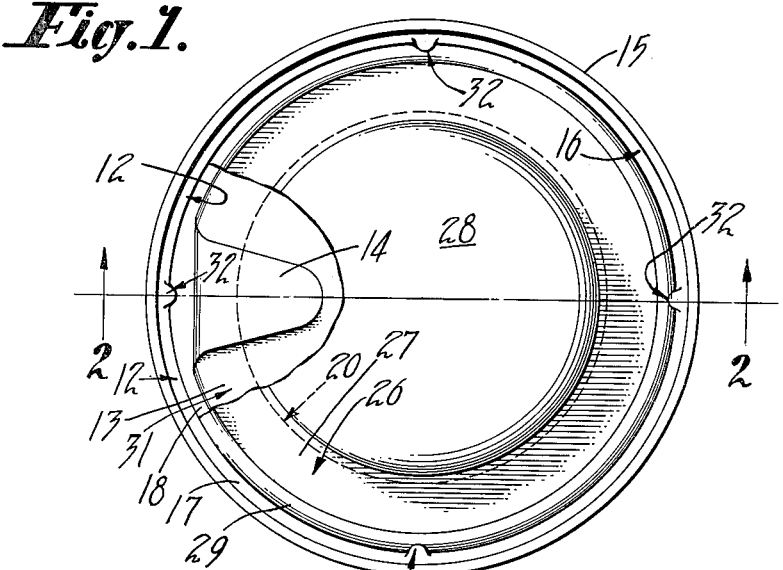

Sept. 7, 1965   G. E. ECKMAN   3,204,810
HERMETICALLY SEALED CONTAINER
Filed Dec. 28, 1962

INVENTOR.
GEORGE ERNEST ECKMAN
BY Edward O. Then
AGENT

United States Patent Office 3,204,810
Patented Sept. 7, 1965

3,204,810
HERMETICALLY SEALED CONTAINER
George Ernest Eckman, Oradell, N.J., assignor to American Can Company, New York, N.Y., a corporation of New Jersey
Filed Dec. 28, 1962, Ser. No. 247,984
2 Claims. (Cl. 220—29)

This invention relates to hermetically sealed cans which may be readily opened without the use of an opening key or other opening device, and has particular reference to a can which is provided with a peelable, easily removable plastic coated sealing disc or diaphragm which is heat sealed to an annular closure ring which also provides a seat for a cover member which protects the diaphragm and provides a reclosure for the container after the diaphragm has been removed.

It has been customary to pack and market products such as coffee, candy, shortening, and the like in hermetically sealed reclosable containers of the type which are formed with a tearing strip which extends around the body of the container adjacent the upper end seam and which requires the use of an opening key for its removal.

While this type of container has for many years provided a very satisfactory package, the recent trend in the packaging field has been toward the development of so-called "easy open" containers which can be opened quickly and easily without the use of tools such as opening keys.

The present invention contemplates the provision of such a container which is hermetically sealed by a thermoplastically coated aluminum sealing disc or diaphragm which is heat sealed to a closure ring which is secured to one end of the container body. Because of the nature of the thermoplastic coating which seals the disc to the closure ring, the sealing disc is easily peeled from the ring when it is desired to open the container. Prior to its removal, the sealing disc is covered and protected by a snap-fit cover member which is engageable in the closure ring above the sealing disc and which is useable as a reclosure after the disc has been removed.

An object of the present invention, therefore, is the provision of a hermetically sealed container which may be readily opened by hand without the use of an opening key or other tool.

A further object is the provision of an impermeable sealing diaphragm which is heat sealed to a rigid ring of the container in a bond which is strong enough to resist rupture when subjected to endwise pressures and yet low enough in peel resistance to permit ready manual removal.

Another object is the provision of a hermetically sealed peelable sealing diaphragm made of a layer of aluminum foil which has laminated to it a layer of a thermoplastic resin which reenforces the foil and which is heat sealable to a rigid container part to provide an adhesive bond which is low in peel resistance.

Numerous other objects and advantages of the invention will be apparent as it is better understood from the following description, which, taken in connection with the accompanying drawings, discloses a preferred embodiment thereof.

Figure 2:
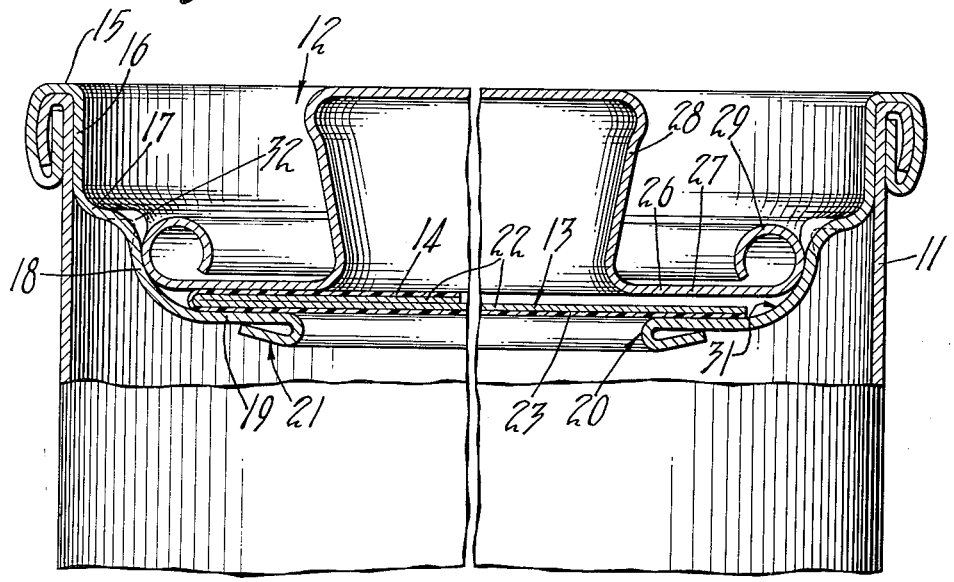

Referring to the drawings:

FIGURE 1 is a top plan view of a sealed container embodying the present invention, a portion of the reclosure member being broken away; and FIG. 2 is a vertical section taken through the upper portion of the instant container and drawn to an enlarged scale, the view being taken substantially along the line 2—2 in FIG. 1, parts being broken away.

As a preferred or exemplary embodiment of the instant invention, the drawings illustrate a cylindrical can which is formed of sheet metal such as tin plate or other suitable material. The can includes a tubular body 11 (FIG. 2) which is closed and sealed at its bottom end by a conventional bottom end member, which for the purposes of this invention need not be shown. At its upper end, the body 11 is closed and sealed by a drawn ring 12 and a sealing disc or diaphragm 13 which is heat sealed to the ring 12 and is provided with an integral, reversely folded pull tab 14 which extends inwardly from its periphery. The ring 12 preferably is secured to the upper end of the can body 11 in a conventional double seam 15 and includes an annular countersink wall 16 which forms the innermost layer of the double seam 15 and at its bottom is bent inwardly to form a narrow, inwardly extending annular step 17. The step 17 in turn is bent downwardly and merges into a depending annular curved wall 18 which terminates at its bottom in an inwardly extending annular seat 19 to which the sealing disc 13 is bonded.

The seat 19 defines a centrally disposed circular dispensing opening 20. The inner edge of the annular seat 19 is bent downwardly and inwardly in a hem 21 to provide a smooth edge surrounding the opening 20.

The sealing disc 13 comprises a thin layer of aluminum foil 22, to the underside of which is laminated a thin overall film of a thermoplastic resin 23 which provides the bond between the disc 13 and the seat 19. In addition to its heat sealing properties, it is necessary that the resin 23 be chemically inert to all products which will be packed in the container 11, and that it have sufficiently low peel resistance to enable it to strip cleanly from the seat 19 when the pull tab 14 is pulled upwardly and radially inwardly by the ultimate consumer when he desires to open the can.

One type of thermoplastic resin which has been found to be suitable for use as the resin 23 is a random copolymer of ethylene and acrylic acid having a copolymerized acrylic acid content in the neighborhood of 3% (plus or minus 0.5%) by weight, based on copolymer weight, and a melt index of 8, plus or minus 1.

When measured at 23° C., this material has the following approximate physical properties:

Density _____ .923
Tensile strength _____p.s.i__ 1720
Tensile impact _____p.s.i__ 1500
Yield strength _____p.s.i__ 1345
Elongation _____percent__ 520
Rigidity _____p.s.i__ 1.5×10⁴
Hardness (Shore C) _____ 80

Peel tests with this ethylene-acrylic acid copolymer wherein two strips of tin plate, each ¾" wide, which are adhered to each other by an interposed layer of this copolymer are pulled apart at an 180° angle at a speed of 1 inch per minute and a temperature of 77° F., indicate a peel strength of about 2.4 lbs. per ¾ lineal inch.

This ethylene-acrylic acid copolymer preferably is extruded directly onto the aluminum foil layer 22 while in a molten state. The most practical way of accomplishing this is to extrude the resin onto a large web of aluminum foil and to then cut the disc 13 from the resultant foil-resin lamination. It has been found that a disc 13 of sufficient strength and flexibility to meet the normal requirements of the instant container is produced when the foil layer 22 is about 0.003 inch thick and the resin layer 23 is about 3 mils thick. These thicknesses can of course be varied to meet specific can requirements. However, it will be realized that the resin layer 23 has substantial tensile strength and adds appreciably to the strength of the aluminum foil 22, increases its resistance to puncture, and seals any pinholes which might have been present in the foil prior to the laminating process.

When this ethylene-acrylic acid copolymer is used as the resin 23, the sealing disc 13 may be bonded to the seat 19 by positioning it thereon and applying sufficient heat and pressure to form a secure heat seal between the resin 23 and the seat 19, care being taken to avoid heating the resin 23 which is present on the pull tab 14. This heat sealing operation is easily accomplished by preheating the ring seat 19 to a temperature of about 325° F. to 345° F. and pressing the disc 13 into place on the seat under moderate pressure to insure a firm seal. It is not desirable to heat the seat 19 to a higher temperature, since in such case degradation of the resin may occur.

It will be understood that although the above described ethylene-acrylic acid copolymer is well suited for use as the thermoplastic resin 23 of the instant container, it is by no means the only material suitable for this purpose; and other compositions having generally comparable sealing and peeling characteristics and which are dry and hard at room temperatures so that they will not adhere to the contents of the can may be substituted.

The sealing disc 13 is protected against accidental opening or puncture while the can is in shipment and storage and until its is opened by an ultimate consumer by a cover member 26 which is positioned in superposed relation to the disc 13.

The cover 26 is preferably drawn from a flat metal blank and is formed with a flat annular panel 27 and a raised centrally disposed, finger engaging knob 28 which preferably does not project above the top of the double seam 15, but which, because of the depth of the stepped closure ring 12, is of sufficient depth to be manually gripped to facilitate easy removal and replacement of the cover. The cover 26 preferably is removably secured in an annular receiving pocket 31 defined by the lower portion of the curved wall 18, as best seen in FIG. 2, and is retained therein by a plurality of equally-spaced inwardly projecting snap lugs or projections 32 which are formed in the upper end of the curved wall 18, and engage the upper portion of the curled rim 29 when the latter is snapped past them, and thus hold the cover 26 on the can in removable snap-fit engagement. It is contemplated that the closure ring 12, disc 13 and cover 26 be pre-assembled in the can manufacturing plant and shipped as a unit to the packing plant where the can is to be filled. The can body 11, with the bottom end seamed on, would be shipped as a unit and filled through the open top end, after which the top closure assembly would be double seamed to the can to finally close it.

The closed can may be opened readily by first snapping cover 26 upwardly past the snap lugs 32 to remove it from the can to thereby uncover the sealing disc 13. The sealing disc 13 then may be removed easily by grasping the pull tab 14 and pulling it upwardly and inwardly to thus cleanly peel off the disc 13 from its sealed position on the seat 19 until it is completely detached. This peeling action originates at the pull tab 14 and proceeds therefrom in both directions around the seat 19 until the sealing disc 13 is completely detached from the can, thus exposing the can's contents. After the desired quantity of the latter has been removed, the cover 26 may be snapped into the pocket 31 for use as a reclosure.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A hermetically sealed container comprising a tubular body, a closure ring secured to an end of said body in an end seam, said ring having a depressed annular seat wall with an opening therein, an annular upstanding wall surrounding said depressed annular seat wall, a plurality of projections on said annular upstanding wall, a peelable plastic coated metal foil disc heat sealed to said depressed annular seat wall for closing and sealing the opening in said container, a pull tab extending from the periphery of said disc, and a cover having a peripheral portion which is removably engageable beneath said projections.

2. A hermetically sealed container comprising a tubular body, a ring secured to an end of said body in an end seam, said ring having a plurality of adjoining walls including a step wall, a depressed annular seat wall, and an annular upstanding wall depending from said step wall and merging into and surrounding said depressed annular seat wall, said depressed annular seat wall having a hemmed inner edge defining a central dispensing opening, a plurality of projections formed on said annular upstanding wall adjacent said step wall, a plastic coated aluminum foil disc heat sealed to said depressed annular seat wall for closing and sealing said opening, a reversely folded pull tab extending from the periphery of said disc, and a cover having an annular panel terminating in a curled peripheral rim which is engageable with said annular wall for snap-in engagement beneath said projections to retain said cover on said container in superposed protective relationship above said disc said cover also having a centrally disposed upwardly projecting finger knob which extends above said panel to facilitate handling of said cover.

References Cited by the Examiner

UNITED STATES PATENTS

| | | | |
|---|---|---|---|
| 799,820 | 9/05 | Young et al. | 220—27 |
| 1,493,638 | 5/24 | Leighton | 220—27 |
| 2,621,826 | 12/52 | Sebell | 220—48 |
| 2,935,188 | 5/60 | Thomas | 206—42 |
| 3,049,224 | 8/62 | Fredette et al. | 206—42 |

THERON E. CONDON, *Primary Examiner.*

FRANKLIN T. GARRETT, *Examiner.*